(12) United States Patent
Rincon-Mora (10) Patent No.: US 6,628,109 B2
(45) Date of Patent: *Sep. 30, 2003

(54) INTEGRATED LOW RIPPLE, HIGH FREQUENCY POWER EFFICIENT HYSTERETIC CONTROLLER FOR DC-DC CONVERTERS

(75) Inventor: Gabriel A. Rincon-Mora, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/883,780

(22) Filed: Jun. 18, 2001

(65) Prior Publication Data

US 2001/0054883 A1 Dec. 27, 2001

Related U.S. Application Data

(60) Provisional application No. 60/214,102, filed on Jun. 26, 2000.

(51) Int. Cl.[7] .............................................. G05F 1/40
(52) U.S. Cl. ...................................................... 323/282
(58) Field of Search ................................ 323/280, 282, 323/284, 351

(56) References Cited

U.S. PATENT DOCUMENTS 4,929,882 A * 5/1990 Szepesi ..................... 323/222
5,063,490 A * 11/1991 Maehara et al. ............. 363/37
5,363,020 A * 11/1994 Chen et al. ............. 315/209 R
5,770,940 A * 6/1998 Goder ........................ 323/282
5,923,542 A * 7/1999 Sasaki et al. ................. 363/16
5,982,106 A * 11/1999 Bobel ..................... 315/209 R
6,369,555 B2 * 4/2002 Rincon-Mora .............. 323/282

* cited by examiner

Primary Examiner—Adolf D. Berhane
(74) Attorney, Agent, or Firm—J. Dennis Moore; W. James Brady, III; Frederick J. Telecky, Jr.

(57) ABSTRACT

The present invention relates to a method of improving power efficiency in a converter circuit at low load currents. The method comprises the steps of monitoring a load current of the converter circuit and adjusting a natural frequency of the converter circuit based on the load current. Such an adjustment of the natural frequency results in a reduction in switching losses at low load currents, thereby improving the power efficiency associated therewith. The present invention also relates to a circuit for improving a power efficiency in a dc—dc converter. The circuit comprises a converter circuit and a comparator circuit coupled to an input of the converter circuit. The dc—dc converter also comprises a feedback circuit coupled between an input and an output of the comparator circuit; the feedback circuit is operable to alter a trip frequency of the comparator circuit as a function of a load current at an output of the converter circuit, thereby decreasing switching losses at low load currents and improving the power efficiency associated therewith.

30 Claims, 6 Drawing Sheets

INTEGRATED LOW RIPPLE, HIGH FREQUENCY POWER EFFICIENT HYSTERETIC CONTROLLER FOR DC-DC CONVERTERS

This application claims priority under 35 USC § 119(e)(1) of provisional application Ser. No. 60/214,102, filed Jun. 26, 2000.

TECHNICAL FIELD

The present invention relates generally to electrical circuits, and more particularly to a circuit and method of generating a hysteretic controller circuit having improved power efficiency at low load currents by making the natural frequency associated therewith a function of the circuit load current.

BACKGROUND OF THE INVENTION

Switching power supply circuits are utilized in a number of different circuit applications. The three basic switching power supply topologies in common use are the buck, boost and buck-boost type power stages. These topologies are non-isolated, that is, the input and output voltages share a common ground. There are, however, isolated derivations of these non-isolated topologies. The differing topologies refer to how the switches, output inductor and output capacitor associated therewith are interconnected. Each topology has unique properties which include the steady-state voltage conversion ratios, the nature of the input and output currents, and the character of the output voltage ripple. Another important property is the frequency response of the duty cycle-to-output voltage transfer function.

The most common power stage topology is the buck power stage, sometimes called a buck converter or a step-down power stage (because the output is always less than the input). The input current for a buck power stage is said to be discontinuous or pulsating if a switching current pulses from zero or some negative value to some positive output current value every switching cycle. The output current for a buck power stage is said to be continuous or nonpulsating because the output current is supplied by an output inductor/capacitor combination. In the latter event, the inductor current never reaches a zero or negative value.

Figure 1A:
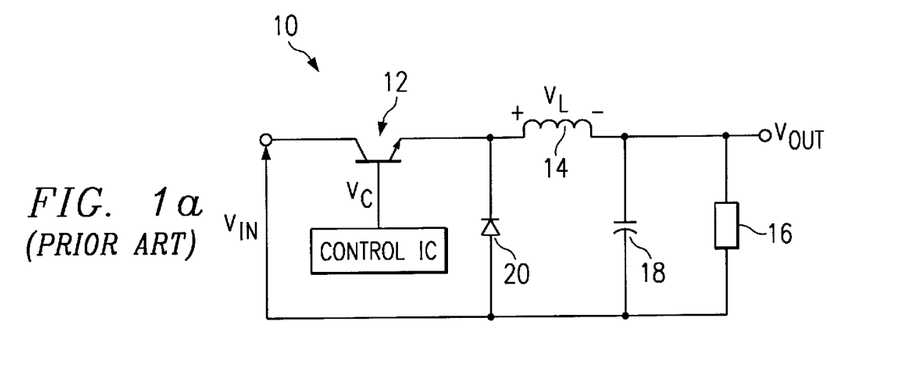
FIG. 1a is a circuit schematic diagram illustrating a conventional buck converter circuit which receives an input voltage signal and provides an output signal associated therewith.
Figure 1B:
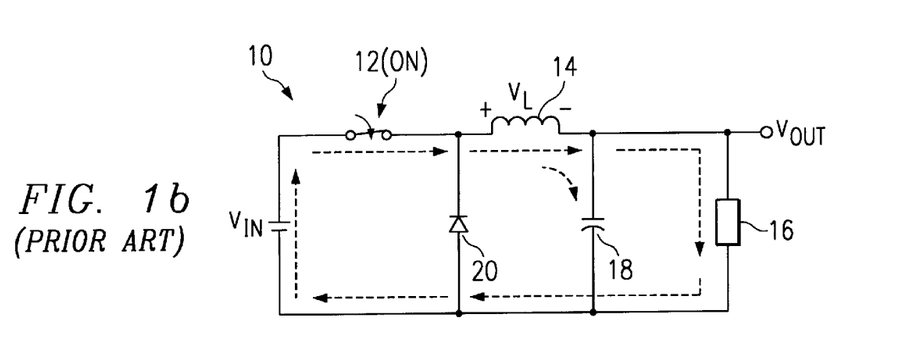
FIG. 1b is a circuit schematic diagram illustrating the conventional buck converter of FIG. 1a in an operational state where the driver or power switch is activated and behaving as a short circuit.

An exemplary basic buck converter circuit is illustrated in prior art FIG. 1a, and designated at reference numeral 10. When a power switch 12 is activated, the switch behaves like a closed circuit, as illustrated in prior art FIG. 1b, and the input voltage $V_{IN}$ is applied to an inductor 14, and power is delivered to an output load 16. The output load voltage is $V_{OUT}=V_{IN}-V_L$, wherein the $V_L$, the voltage across the inductor 14, is given by L(di/dt). The output voltage $V_{OUT}$ also is formed across a capacitor 18, thus the capacitor charges and the output voltage increases each time the switch 12 is closed.

Figure 1C:
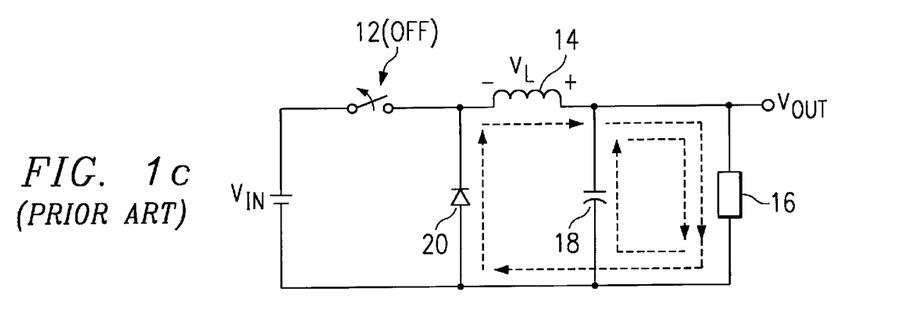
FIG. 1c is a circuit schematic diagram illustrating the conventional buck converter of FIG. 1a in an operational state where the driver or power switch is not activated and behaving as an open circuit.
Figure 2:
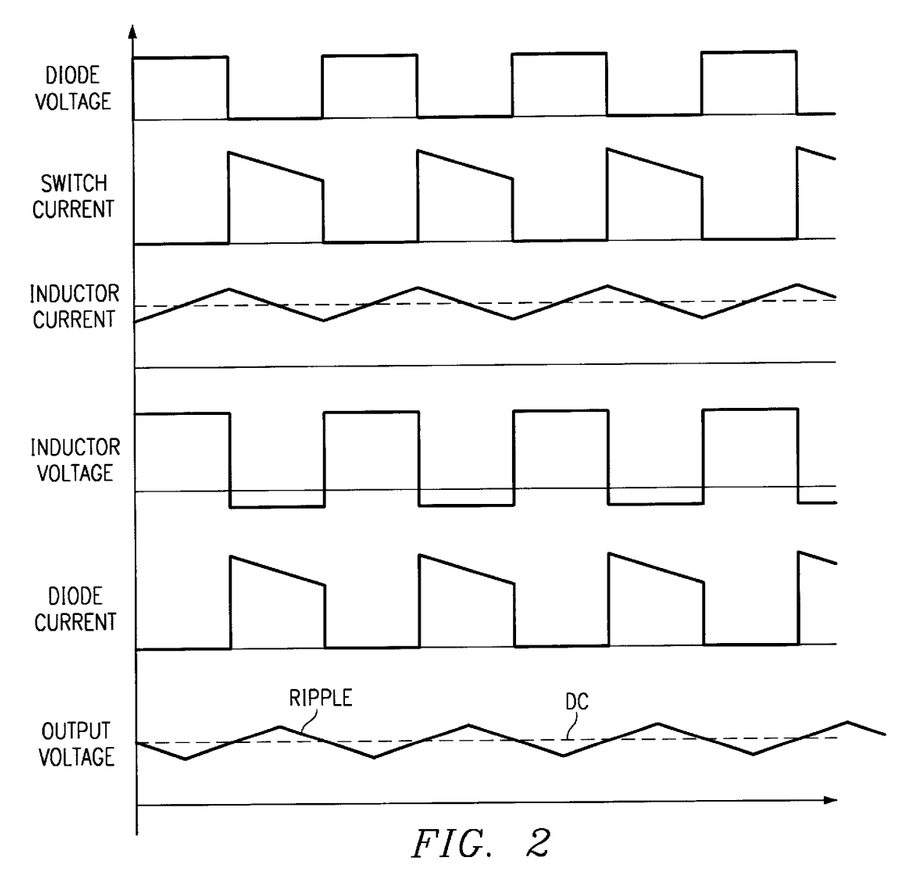
FIG. 2 is a series of waveform diagrams illustrating exemplary voltage and current waveforms at various nodes in the buck converter circuit of FIG. 1a over a period of time as the buck converter circuit progresses through a series of differing operational states.

When the switch 12 is deactivated, or turned off, the switch 12 behaves as an open circuit, as illustrated in prior art FIG. 1c, and the voltage across the inductor 14 reverses due to inductive flyback, thus making a circuit diode 20 forward biased. The circuit loop generated by the diode 20 allows the energy stored in the inductor 14 to be delivered to the output load 16, wherein the output current is smoothed by the capacitor 18. Typical waveforms for a buck converter are shown in FIG. 2. The power switch 12 is switched at a relatively high frequency (e.g., between about 20 KHz and about 300 KHz for most converters) to produce a chopped output voltage, however, the inductor 14 and capacitor 18 together operate as an LC filter to produce a relatively smooth output voltage having a DC component with a small ripple voltage overlying the DC value (see, e.g., output voltage waveform of FIG. 2). The ripple voltage can be controlled by varying the duty cycle of the power switch control voltage.

Figure 3:
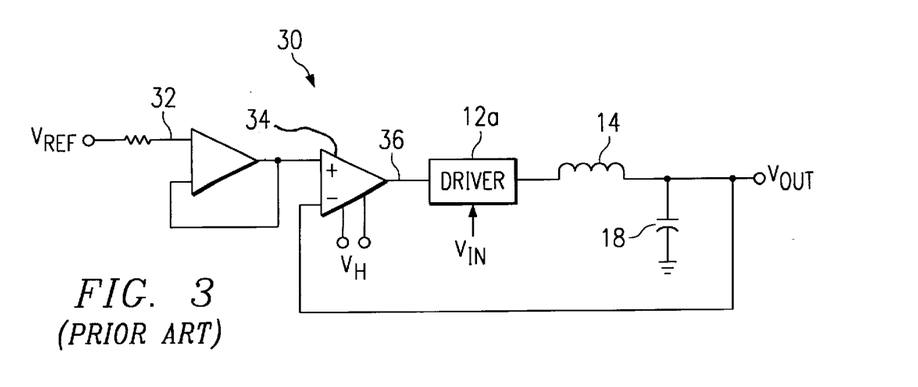
FIG. 3 is a circuit schematic diagram illustrating a conventional hysteretic dc—dc converter.
Figure 4:
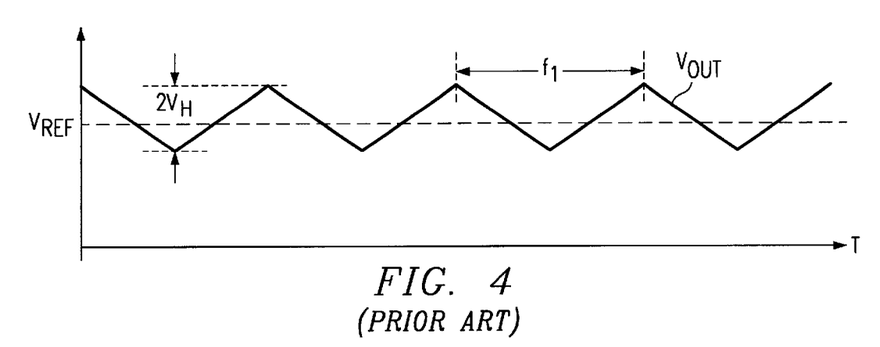
FIG. 4 is a waveform diagram illustrating the output voltage of the conventional hysteretic dc—dc converter of FIG. 3 and how the ripple voltage and the natural frequency associated therewith is a function of the hysteretic window of the comparator.

The base principle of operation in the above buck converter 10 is often utilized in hysteretic dc—dc converters, as illustrated in prior art FIG. 3, and designated at reference numeral 30. The circuit 30 is similar in various respects to the buck converter 10 of FIG. 1a and employs a unity gain buffer 32 serially coupled to an analog comparator circuit 34 having a hysteresis $V_H$. The comparator 34 compares the input reference voltage $V_{REF}$ to the circuit output voltage $V_{OUT}$ and provides an output signal at node 36 which is a function of the comparison and constitutes a generally square wave. An exemplary output voltage waveform for the circuit 30 is illustrated in FIG. 4.

The hysteresis $V_H$ of the comparator 34 impacts the operation of the circuit 30 in the following manner. As the output $V_{OUT}$ falls below a voltage $V_{REF}-V_H$, the comparator 34 trips and the output thereof at node 36 goes from zero to the supply, ideally, which then is fed to the circuit output $V_{OUT}$ (wherein, $V_{OUT}$ is a function of the output of the comparator and the duty cycle of the driver). Similarly, as $V_{OUT}$ increases to a voltage $V_{OUT}+V_H$, the comparator 34 again trips and the output thereof at node 36 decreases to zero volts, which is fed to the circuit output $V_{OUT}$. Therefore the hysteresis $V_H$ of the comparator 34 dictates an amount of voltage ripple ($2*V_H$) about the target reference voltage $V_{REF}$, as illustrated in FIG. 4, and, in conjunction with the output capacitor dictates a natural frequency of the ripple voltage at the output $V_{OUT}$.

In many applications it is desirable to increase the natural frequency of the circuit 30 since a higher frequency allows use of a smaller capacitor, provides a smaller output ripple voltage, and provides a faster circuit response time. One conventional way of decreasing the natural frequency of a hysteretic dc—dc converter is to decrease the hysteretic window of the comparator 34. That is, instead of using a hysteretic value of $V_H$, a smaller value (e.g., $V_H-\Delta V_H$) is used. With a smaller hysteretic window, the comparator 34 trips earlier, thus increasing the natural frequency. While decreasing the hysteretic window in systems employing relatively large ripple voltages (e.g., on the order of about 100 mV or more) is a viable solution, such an approach is not practical in systems employing smaller ripple voltages (e.g., on the order of about 50 mV or less) because in such systems it becomes difficult to generate a well-controlled hysteresis window that is small and simultaneously insensitive to noise and random offset voltages. In other words, the accuracy requirements of the hysteretic comparator are generally more stringent for lower ripple voltages.

Therefore there is a need in the art for a circuit and method of providing an increased natural frequency in hysteretic circuits without altering the hysteretic window associated therewith.

SUMMARY OF THE INVENTION

According to the present invention, a circuit and method of altering the natural frequency of a hysteretic circuit as a function of load current is disclosed.

The present invention varies the natural frequency of a hysteretic dc—dc converter circuit as a function of the converter load current. The present invention generates and couples an AC ramp signal to the input reference voltage.

The AC ramp signal preferably is an inverted version of the feedback output voltage used as the sense node in conventional circuit. The AC ramp signal has a slope which is a function of the circuit load current and is used to vary a natural frequency of the converter circuit as a function of the converter circuit load current. For example, the slope of the ramp signal is decreased as the load current decreases. The decreased ramp signal slope decreases the trip frequency of a comparator circuit which decreases the natural frequency of the converter circuit, thereby lowering switching losses associated therewith and improving the power efficiency at low load currents.

According to one aspect of the present invention, a hysteretic dc—dc converter circuit includes a feedback circuit in addition to the traditional feedback for altering a natural frequency of the converter. The feedback circuit includes positive and negative ramp current source circuits which are utilized to charge and discharge a ramp capacitor at rates which are a function of the load current. The ramp capacitor voltage is then used as the ramp signal to alter a trip frequency of a comparator circuit within the converter which results in an adjustment of the natural frequency of the converter circuit with variations in load current. For example, the positive and negative ramp current sources decrease the rate of charge and discharge of the ramp capacitor, respectively, as the load current decreases, thereby decreasing the positive and negative slopes of the ramp signal. Such decreased slopes decreases the natural frequency of the converter circuit at low load currents, thereby improving power efficiency thereat.

According to another aspect of the present invention, a method of improving the power efficiency of a hysteretic dc—dc converter is disclosed. The method comprises initiating the operation of a buck converter circuit and monitoring a load current thereof. A feedback ramp signal is then generated having a slope which is a function of the load current and the feedback ramp signal is fed to the comparator circuit. In addition, the feedback ramp signal contains the converter circuit duty cycle information. The comparator circuit then generates an output signal based on the converter output signal and the generated feedback ramp signal, wherein the comparator circuit output signal exhibits a trip frequency which is a function of the load current. In particular, the trip frequency, which is related to the natural frequency of the circuit, decreases as the load current decreases, thereby reducing switching losses at low load currents.

To the accomplishment of the foregoing and related ends, the invention, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed and the present invention is intended to include all such embodiments and their equivalents. Other objects, advantages and novel features of the invention will become apparent from the following detailed description of the invention when considered in conjunction with the drawings.

DETAILED DESCRIPTION OF THE INVENTION

The present invention will now be described with respect to the accompanying drawings in which like numbered elements represent like parts.

Figure 5:
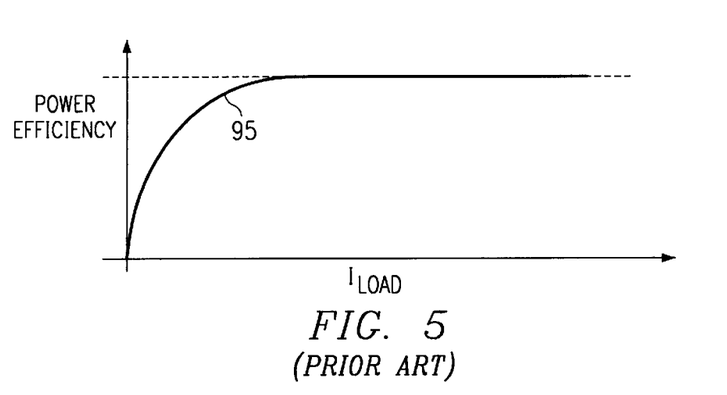
FIG. 5 is a waveform diagram illustrating a disadvantageous feature of prior art converter circuits, wherein the power efficiency decreases at low load currents.

Another problem associated with prior art dc—dc converter circuits which was appreciated by the inventor of the present invention is poor power efficiency. That is, at low load currents, the power efficiency of dc—dc converters decreases. This undesirable circuit characteristic is illustrated in prior art FIG. 5 and designated at reference numeral 95. Note that as the load current decreases, the power efficiency falls off; this characteristic results because switching losses are constant with respect to the load current. The power efficiency of a prior art dc—dc converter circuit may be characterized by the following equation:

Power Efficiency=$P_{OUT}/(P_{OUT}+P_{CONTROL(DC)}+P_{CONTROL(AC)})$.

As the load current decreases, $P_{OUT}$ and $P_{CONTROL(DC)}$ decreases, but the switching losses $P_{CONTROL(AC)}$ are constant because the natural frequency of prior art dc—dc converters vary minimally. The present invention overcomes the disadvantages of the prior art by varying the natural frequency of the dc—dc converter as a function of the load current. Therefore as the load current decreases, the system and method of the present invention decrease the natural frequency of the converter and thus reduce the switching losses associated therewith, thus substantially improving the power efficiency of dc—dc converters over variations in load current. Therefore the present invention makes the frequency a linear function of the load current.

The present invention is directed to a system and method of improving power efficiency in converter circuits. Such power efficiency improvements are achieved by varying the natural frequency of the converter circuit as a function of load current. In particular, as the load current decreases, the natural frequency of the converter circuit is decreased, thereby reducing the switching losses associated therewith and improving the power efficiency.

According to one particular aspect of the present invention, a circuit and method of adjusting a natural frequency of a hysteretic dc—dc converter as a function of load current without requiring an alteration of a hysteretic window associated therewith is disclosed. The invention adjusts the natural frequency of the converter by providing an additional feedback path back to the comparator. The additional feedback comprises a ramp signal which is related to the comparator output and which is out of phase therewith. The additional feedback along with an output sense node feedback increases a trip frequency of a comparator within the converter, thereby increasing a natural frequency of the converter. In addition, the slope of the ramp signal is a function of the load current, and therefore results in a variation in the natural frequency of the circuit as a function of load current. This characteristic is exploited so as to decrease the natural frequency of the circuit at low load currents and thus improve the power efficiency associated therewith.

Figure 6:
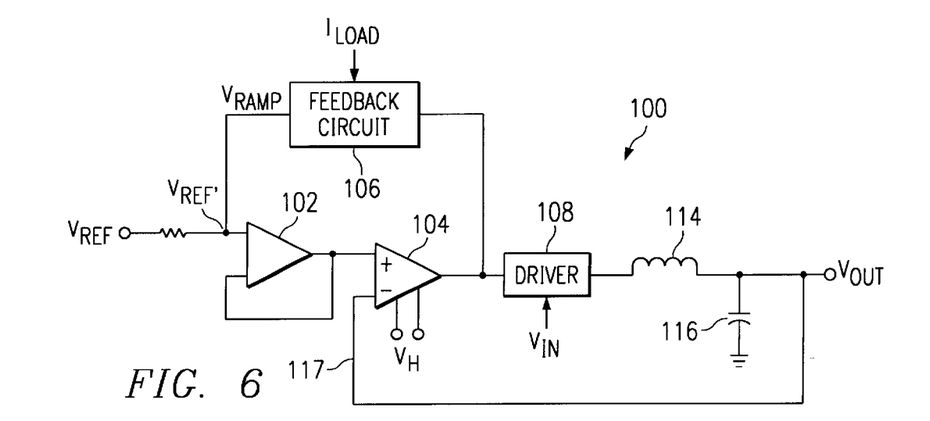
FIG. 6 is a circuit schematic diagram illustrating a hysteretic dc—dc converter containing a feedback circuit for altering the natural frequency of the converter according to the present invention.

Turning now to the figures, FIG. 6 is an exemplary circuit schematic diagram illustrating a low ripple, high frequency hysteretic dc—dc converter circuit 100 according to the present invention. The circuit 100 includes a buffer 102, such as a unity gain amplifier as shown, which feeds one input of a comparator circuit 104 having a hysteresis characteristic of $V_H$. A feedback circuit 106 is coupled to an output of the comparator 104 and provides a feedback signal $V_{RAMP}$ back to the buffer 102. The buffer 102 receives two input signals at its input node ($V_{REF}$) and thus $V_{REF'}=V_{REF}+V_{RAMP}$, wherein $V_{REF}$ is an input reference voltage and $V_{RAMP}$ is a signal superimposed over $V_{REF}$ which will be discussed in greater detail below.

The output of the comparator circuit 104 is also coupled to a driver circuit 108, such as a power switch (e.g., a BJT or a MOSFET). The driver circuit 108 is also coupled to an LC filter 112 comprising an inductor 114 and a capacitor 116, respectively. The circuit output $V_{OUT}$ is taken across the capacitor 116, as shown in FIG. 5, and is also fed back to another comparator input as a sense node 117.

In operation, the circuit 100 provides for an increased natural frequency over conventional circuits without requiring a modification of the comparator hysteresis to alter the hysteresis window (e.g., $2*V_H$). The circuit 100 accomplishes the above operation by employing two forms of feedback to the comparator circuit 104. In particular, the output signal $V_{OUT}$ is fed back (sense node 117) to one terminal of the comparator in a conventional manner while another signal $V_{REF'}$, which is out of phase with $V_{OUT}$, is supplied to the other comparator input. Since the comparator input signals ($V_{REF'}$ and $V_{OUT}$) are out of phase the hysteresis trip point $V_H$ is reached causing the comparator circuit 104 to trip although neither input signal has reached a value of $V_{REF}±V_H$ (which was necessary to trip the comparator in prior art circuits). Therefore the natural frequency of the circuit 100, as dictated by the frequency at which the comparator circuit 104 trips ($f_2$), is increased over conventional circuits ($f_2>f_1$) although the hysteresis of the comparator (which defines the hysteresis window) is not required to be decreased.

Figure 7:
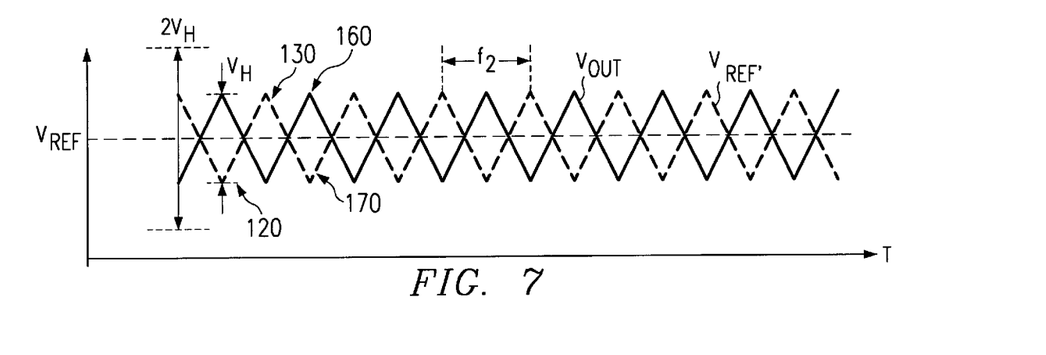
FIG. 7 is a waveform diagram illustrating circuit waveforms at various nodes of the hysteretic converter of FIG. 6 according to the present invention.

The manner in which the circuit 100 of FIG. 6 operates to achieve the above advantageous functionality may be further understood in conjunction with FIG. 7. As discussed previously, the comparator circuit 104 trips when the difference between the two input terminals exceeds the hysteresis value $V_H$. The manner in which the comparator circuit 104 trips (e.g., begins increasing or decreasing in a generally linear manner at its output) depends upon which of the input terminals is greater than the other. In conventional circuits (e.g., circuit 30 of FIG. 3), the positive input terminal of the comparator was fixed while the negative input terminal (the sense node 117) varied. Therefore the voltage swing previously necessary at the negative input terminal of the comparator to trip from one operating condition to another was $2*V_H$ (e.g., from $V_{REF}-V_H$ to $V_{REF}+V_H$, or vice-versa). Consequently, the hysteresis window ($2*V_H$) of the comparator dictated the natural frequency in conventional circuits.

The circuit 100 of the present invention feeds back the output voltage $V_{OUT}$ to one input terminal of the comparator 104 and, instead of providing a fixed input voltage at the other comparator input terminal (as in conventional circuits), provides a varying voltage ($V_{REF'}$) thereat which is out of phase with $V_{OUT}$. As a result, the voltage swing at the output $V_{OUT}$ does not dictate alone the trip frequency of the comparator 104, but instead the trip frequency is a function of both inputs. In addition, as will be described in greater detail later, the feedback voltage $V_{RAMP}$ provided by the feedback circuit 106 preferably is generated as an inverted version of $V_{OUT}$ to maximize the above-described benefit. Furthermore, the speed or slope of the ramp may be tuned to fit a variety of performance criteria, as may be desired. In particular, as will be described in greater detail infra, the slope of the ramp signal $V_{RAMP}$ is made a function of the load current such that as the load current decreases, the slope of $V_{RAMP}$ also decreases, thereby decreasing the natural frequency of the converter circuit 100.

Referring to FIG. 7, exemplary voltage waveforms that are input to the comparator circuit 104 are illustrated, that is, $V_{REF'}$ and $V_{OUT}$, respectively. According to the present example, the two signals are 180 degrees out of phase with one another such that as one signal is increasing, the other is decreasing. As illustrated in FIG. 7, at point 120, for example, the difference between the two signals is $V_H$, consequently the comparator circuit 104 trips. The output of the comparator 104 is delivered to the driver circuit 108 and is also coupled to the feedback circuit 106 which uses the signal to generate $V_{RAMP}$ which, when superimposed over $V_{REF}$ provides $V_{REF}'$ as illustrated in FIG. 7. According to a preferred aspect of the present invention, $V_{RAMP}$ is related to the duty cycle of the driver circuit 108 and contains therein duty cycle information so that the feedback circuit 106 does not affect adversely the circuit output voltage (since $V_{OUT}=V_{IN}*D$, wherein D is the duty cycle of the drive 108). In addition, any circuit or method of generating a feedback signal that out of phase with the output $V_{OUT}$ as discussed above may be utilized as the feedback circuit 106 and is contemplated as falling within the scope of the present invention.

Figure 8:
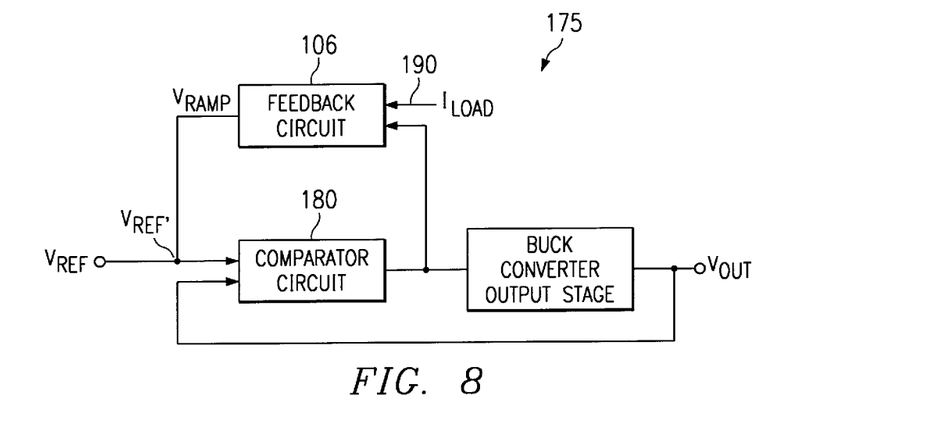
FIG. 8 is a circuit schematic diagram illustrating a hysteretic dc—dc converter containing a feedback circuit for altering the natural frequency of the converter as a function of the load current according to the present invention.
Figure 9:
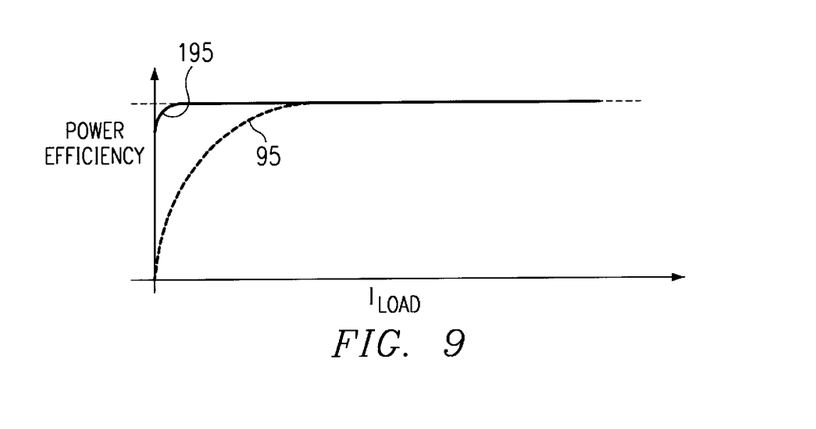
FIG. 9 is a waveform diagram illustrating an improved power efficiency over variations in load current according to the present invention.

A hysteretic dc—dc converter circuit employing a particular exemplary feedback circuit for generating feedback in accordance with the circuit of FIG. 6 is illustrated in FIG. 8. In FIG. 8, the feedback circuit 106 receives the output of the comparator circuit 180 (such as comparator 104 of FIG. 6) and a signal 190 which is representative of the load current $I_{LOAD}$ at the output $V_{OUT}$. Using the load current signal 190, the feedback circuit 106 generates a ramp signal $V_{RAMP}$ having a slope which is a function of the load current $I_{LOAD}$. As discussed above in conjunction with FIG. 7, as the slope of $V_{RAMP}$ is altered, the trip frequency of the comparator circuit 180 changes accordingly. In particular, as the slope of $V_{RAMP}$ decreases, the trip frequency of the comparator circuit 180 decreases, thereby resulting in a decrease in the natural frequency of the circuit 175. Since the natural frequency of the circuit 175 decreases the switching losses associated therewith also decreases ($P_{CONTROL(AC)}$), thus improving the power efficiency at low load currents, as illustrated in FIG. 9 and designated at reference numeral 195.

Figure 10:
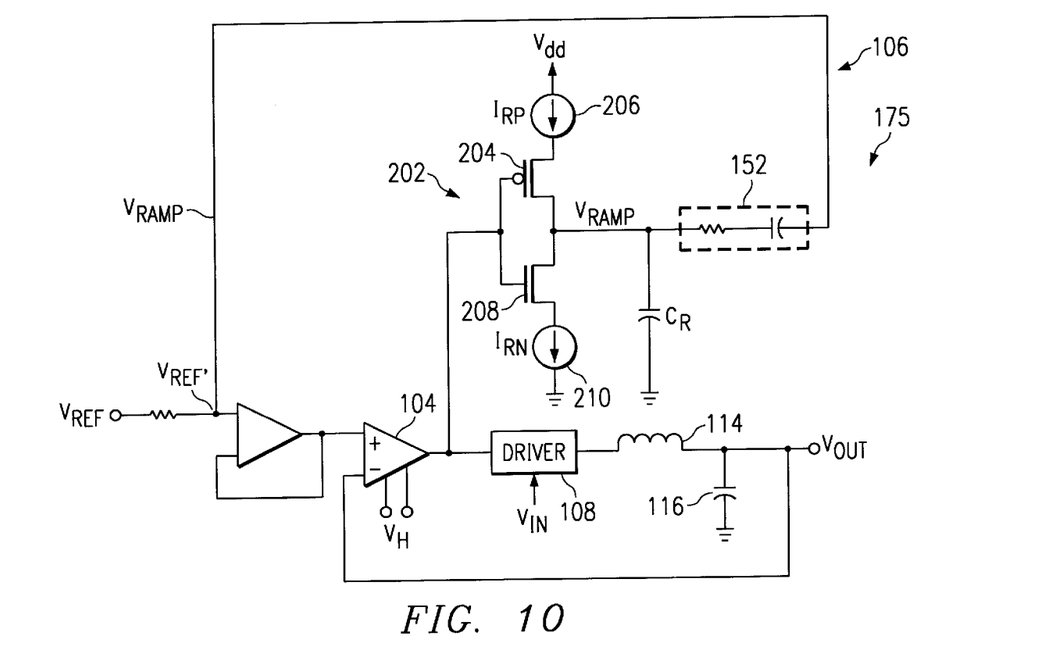
FIG. 10 is a circuit schematic diagram illustrating in greater detail the converter circuit of FIG. 8 according to an exemplary aspect of the present invention.

The circuit 175 of FIG. 8 is illustrated according to one exemplary aspect of the invention in greater detail in FIG. 10. The circuit 175 of FIG. 10 includes a current limited CMOS inverter 202 coupled to an output of the comparator 104. The inverter circuit 202 has a PMOS transistor 204 coupled to a positive ramp current source 206 and an NMOS transistor 208 coupled to a negative ramp current source 210. When the output of the comparator 104 is low, the PMOS transistor 204 is on and a current dictated by the positive ramp current source 206 charges a ramp capacitor $C_R$, thus causing the ramp voltage $V_{RAMP}$ to increase. Similarly, when the output of the comparator circuit 104 goes high, the NMOS transistor 208 turns on and a current dictated by the negative ramp current source 210 discharges the ramp capacitor $C_R$. Such discharging causes the ramp voltage $V_{RAMP}$ to decrease.

Figure 11:
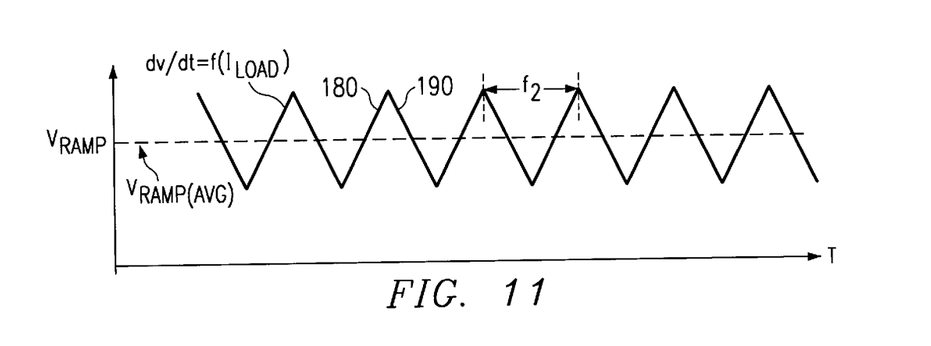
FIG. 11 is a waveform diagram illustrating a ramp voltage waveform in the feedback circuit of FIG. 10 according to the present invention.

As can be seen from FIG. 10, the ramp voltage $V_{RAMP}$ increases and decreases based on the output of the comparator circuit 104. Further, the rate at which $V_{RAMP}$ changes is based on the positive ramp and negative ramp current sources 206 and 210, respectively. According to one aspect of the present invention, the current magnitudes of the current sources 206 and 210 are a function of the load current and duty cycle, thereby making the rate at which the ramp capacitor $C_R$ charges and discharges a function of the load current $I_{LOAD}$. Therefore, since I=C(dv/dt), the ramp voltage $V_{RAMP}$ is also a function of the load current $I_{LOAD}$, as illustrated in FIG. 11. Consequently, as the slope of $V_{RAMP}$ is changed, the trip frequency of the comparator circuit 104 is also adjusted, thereby altering the natural frequency of the converter circuit 175.

Figure 12:
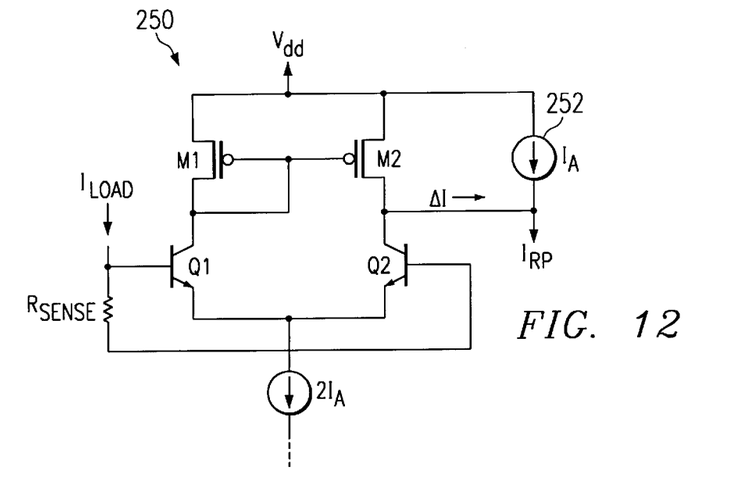
FIG. 12 is a circuit schematic diagram illustrating an exemplary positive ramp current source circuit for providing a charging current which is a function of the load current according to the present invention.

Various circuits may be utilized for generating current sources which provide a current which is a function of the load current $I_{LOAD}$, and any such circuit may be employed and is contemplated as falling within the scope of the present invention. One exemplary circuit for providing such functionality is illustrated in FIG. 12, and designated at reference numeral 250. The circuit 250 includes a bipolar differential pair Q1 and Q2 having a sense resistor $R_{SENSE}$ coupled between their respective base terminals. The circuit 250 also includes two PMOS transistor M1 and M2 which conduct a current therethrough based on the differential voltage across the differential input pair Q1 and Q2. A current source 252 is coupled in parallel with PMOS transistor M2.

The circuit 250 of FIG. 12 operates as follows. The load current $I_{LOAD}$ conducts through the sense resistor $R_{SENSE}$, thereby generating a differential input voltage across the differential input pair Q1 and Q2, which is a function of the load current. That is:

$$V_{DIFF}=I_{LOAD} * R_{SENSE}.$$

The differential pair Q1 and Q2 and the PMOS transistors M1 and M2 act as a transconductance amplifier, such that the current $\Delta I$ is a function of the circuit transconductance $g_m$ and the differential voltage. That is:

$$\Delta I=V_{DIFF} * g_m.$$

The transconductance of the circuit is one-half the tail current $2*IA$ divided by the thermal voltage $V_T$. That is:

$$g_m=\tfrac{1}{2}(2*I_A)/V_T=I_A/V_T.$$

Therefore $\Delta I$ can be calculated in terms of the load current as follows:

$$\Delta I=V_{DIFF}*g_m=(I_{LOAD}*R_{SENSE})*(I_A/V_T).$$

Since $I_{RP}=I_A+\Delta I$, $I_{RP}$ can be characterized as follows:

$$I_{RP}=I_A+\Delta I=I_A+I_A(I_{LOAD}*R_{SENSE})/V_T=I_A(1+I_{LOAD}*R_{SENSE}/V_T).$$

Therefore the positive ramp current $I_{RP}$ is clearly a function of the load current $I_{LOAD}$ so that as $I_{LOAD}$ decreases, $I_{RP}$ also decreases, thereby slowing the rate at which the ramp capacitor is charged.

Figure 13:
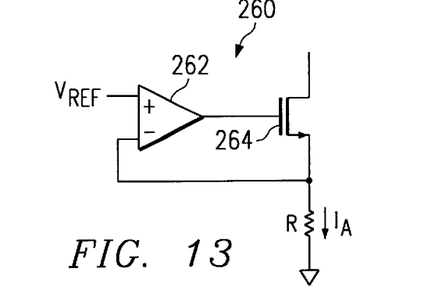
FIGS. 13 and 14 are circuit schematic diagrams illustrating current source circuits according to an exemplary aspect of the present invention.

The current source 252 of FIG. 12 which produces $I_A$ may be any type of circuit which produces the above-described functionality and any such circuit is contemplated as falling within the scope of the present invention. One exemplary circuit for generating the current $I_A$ is illustrated in FIG. 13, and designated at reference numeral 260. The circuit 260 of FIG. 13 includes a transconductance amplifier 262 having an output which drives an NMOS transistor 264. The source of the transistor 264 is fed back to the inverting input of the amplifier 262 and the reference voltage $V_{REF}$ is tied to the non-inverting input, respectively. Therefore the current $I_A$ conducting through the circuit 260 is as follows:

$$I_A=(V_{REF}-0)/R=V_{REF}/R,$$

which is equal to $V_{OUT}/R$ since $V_{OUT}$ is approximately equal to $V_{REF}$. Thus the magnitude of $I_A$ may be easily set by the magnitude of the resistor R.

The negative ramp current source 210 ($I_{RN}$) of FIG. 10 may be generated using a circuit which is similar to the circuit 250 of FIG. 12. Such a circuit may differ slightly, for example, having a PNP bipolar differential input pair and a pair of gate-coupled NMOS transistors positioned below and coupled to the differential pair. The tail current source ($2*I_{AC}$) would be positioned above the differential input pair and the $\Delta I$ would be taken at the drain of one of the NMOS transistors. Of course, other circuits may also be utilized and are contemplated as falling within the scope of the present invention.

Figure 14:
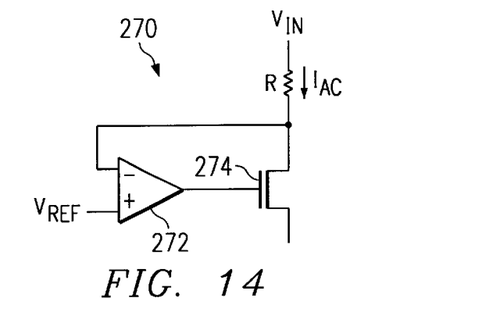

An exemplary $I_{AC}$ current source circuit for the negative ramp current source 210 ($I_{RN}$) is illustrated in FIG. 14 and designated at reference numeral 270. The circuit 270 includes a transconductance amplifier 272 having an output which drives a PMOS transistor 274. The source of the PMOS transistor feeds back to an inverting input of the amplifier 272 while the reference voltage $V_{REF}$ is tied to the non-inverting input, respectively. In the above configuration, a current $I_{AC}$ is given by:

$$I_{AC}=(V_{IN}-V_{REF})/R$$

Since $V_{REF}$ is equivalent to $V_{OUT}$, the above equation can be rewritten as:

$$I_{AC}=(V_{IN}-V_{OUT})/R.$$

Therefore the current $I_{AC}$ can be determined by the value of the resistor R and also contains the duty cycle information of the drive circuit 108 for proper operation, as may be desired. Duty cycle information is maintained as can be seen from the equations below:
The charging ramp current is:

$$I_{CH}=I_A=C_R(dv/dt)=C_R(dv/T_{OFF}),$$

and the discharging ramp current is:

$$I_{DIS}=I_{AC}=C_R(dv/dt)=C_R(dv/T_{ON}).$$

Therefore $T_{ON}$ and $T_{OFF}$ may be characterized as follows:

$$T_{OFF}=(C_R/I_A)dv,$$

and $$T_{ON}=(C_R/I_{AC})dv.$$

The duty cycle (D) of the converter is defined by:

$$D=T_{ON}/(T_{ON}+T_{OFF}),$$

therefore D can be expressed in term of the equations above as:

$$D=(C_R/I_{AC})dv/[(C_R/I_{AC})dv+(C_R/I_A)dv].$$

By simplifying terms, the duty cycle (D) can be expressed as follows:

$$D=1/[I_{AC}(1/I_{AC}+1/I_A)].$$

As shown by the equations provided supra, we know that:

$$I_A=V_{OUT}/R,$$

and $$I_{AC}=(V_{IN}-V_{OUT})/R.$$

Therefore we can insert these equations to further solve for the duty cycle:

$$D=R/[(V_{IN}-V_{OUT})(R/(V_{IN}-V_{OUT})+R/V_{OUT})],$$

which simplifies to:

$$D=V_{OUT}/V_{IN}.$$

As shown above, the present invention is directed to a circuit for improving the power efficiency of a dc—dc converter circuit by varying the natural frequency of the circuit as a function of the load current. In particular, at low load currents, the natural frequency of the circuit is decreased which reduces the negative impact of switching losses associated therewith.

Figure 15:
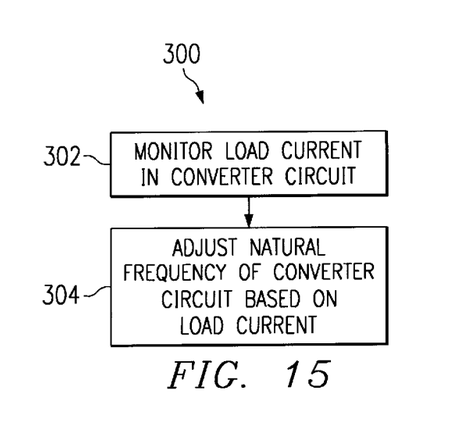
FIG. 15 is a flow chart diagram illustrating a method of altering a natural frequency of a hysteretic dc—dc converter based on the load current according to the present invention.

According to another aspect of the present invention, a method of reducing switching losses at low load currents is disclosed which increases the power efficiency of a converter circuit. Such a method is illustrated in FIG. 15, and designated at reference numeral 300. The method 300 begins at step 302 by monitoring a load current of the converter circuit. The method 300 then continues at step 304 by adjusting a natural frequency of the converter circuit based on the monitored load current of step 302. In particular, the natural frequency of the converter circuit is decreased as the load current decreases, thereby reducing switching losses associated therewith which improves the power efficiency over variations in load current.

Figure 16:
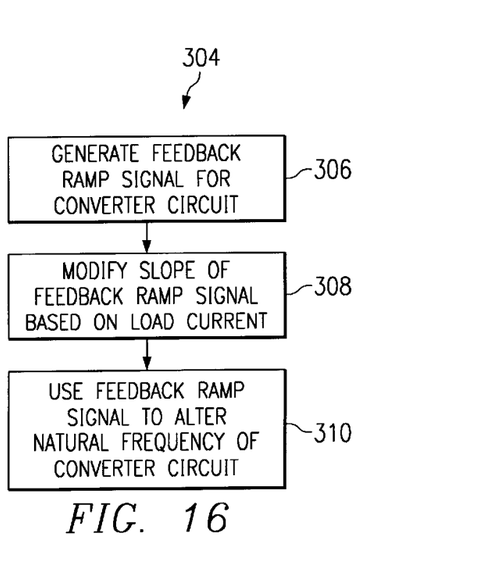
FIG. 16 is a flow chart diagram illustrating a method of adjusting the natural frequency of the converter circuit based on the load current.

The step 304 of adjusting the natural frequency of the converter circuit based on the load current may be accomplished in a variety of different ways and any manner of making such an adjustment is contemplated as falling within the scope of the present invention. On exemplary way of adjusting the natural frequency is illustrated in FIG. 16. A feedback ramp signal is generated and is fed back to the comparator circuit in a converter circuit so as to alter the trip frequency of the comparator circuit at step 306. The slope of the generated ramp signal is then modified at step 308 based on the load current. The modified ramp signal is then fed back to the comparator circuit at step 310 to alter the trip frequency thereof, and thereby alter the natural frequency of the converter circuit. For example, the slope of the ramp signal is reduced when the load current decreases to thereby reduce the trip frequency and thus the natural frequency of the converter circuit. Therefore the natural frequency of the converter circuit decreases at low load currents which results in reduced switching losses and improved power efficiency over variations in load current.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A method of improving power efficiency in a hysteretic DC—DC converter circuit at low load currents, comprising the steps of:
   monitoring a load current of the converter circuit; and
   adjusting a natural frequency of the converter circuit based on the load current.

2. The method of claim 1, wherein adjusting the natural frequency comprises making the natural frequency a generally linear function of the load current.

3. The method of claim 1, wherein adjusting the natural frequency comprises making the natural frequency a discrete function of the load current.

4. The method of claim 1, wherein adjusting the natural frequency comprises decreasing the natural frequency of the converter circuit when the load current decreases.

5. The method of claim 1, wherein monitoring the load current comprises detecting a voltage across a resistor having the load current conducting therethrough or a current associated with the load current conducting therethrough.

6. A method of improving power efficiency in a converter circuit at low load currents, wherein the converter circuit comprises a buck converter circuit having an input terminal and an output terminal which forms a converter circuit output, and a comparator circuit having an output coupled to the input terminal of the buck converter circuit, a first input coupled to the converter circuit output, and a second input coupled to an input reference voltage, comprising the steps of:
monitoring a load current of the converter circuit; and
adjusting a natural frequency of the converter circuit based on the load current by
generating a ramp voltage signal having a ramp rate associated therewith which is a function of the load current, and
using the ramp voltage signal to alter a trip frequency of the comparator circuit, wherein the trip frequency is related to the natural frequency of the converter circuit.

7. The method of claim 6, wherein the ramp voltage signal contains duty cycle information associated with the buck converter circuit.

8. The method of claim 6, wherein using the ramp voltage signal to alter the trip frequency comprises superimposing the ramp voltage signal on the reference voltage.

9. The method of claim 8, further comprising modulating the ramp rate of the ramp voltage signal in a manner which is related to the load current.

10. The method of claim 9, wherein the ramp rate is modulated by a signal which is proportional to the load current.

11. The method of claim 8, wherein generating the ramp voltage comprises generating a charge current and a discharge current for charging and discharging a capacitor, respectively, wherein one or both of the charge current and the discharge current are a function of the load current.

12. The method of claim 11, wherein generating the charge current comprises:
generating a reference current; and
adding a correction current to the reference current, wherein the correction current has a magnitude which is a function of the load current, and wherein the reference current and the correction current together form the charge current.

13. The method of claim 12, wherein generating the correction current comprises:
generating a differential input voltage which is a function of the load current; and
placing the differential input voltage across inputs terminals of a differential transconductor amplifier, wherein an output current of the differential transconductor amplifier is a function of the differential input voltage and thus a function of the load current.

14. A circuit for improving a power efficiency in a hysteretic DC—DC converter, comprising:
a converter circuit;
a comparator circuit coupled to an input of the converter circuit; and
a feedback circuit coupled between an input and an output of the comparator circuit, wherein the feedback circuit is operable to alter a trip frequency of the comparator circuit as a function of a load current at an output of the converter circuit.

15. The circuit of claim 14, wherein the converter circuit comprises a buck converter circuit.

16. The circuit of claim 14, wherein an output of the converter circuit is fed back to an input of the comparator circuit, and wherein the comparator inputs from the converter circuit output and the feedback circuit dictate the trip frequency of the comparator circuit.

17. The circuit of claim 14, wherein the feedback circuit further comprises an output load current sense circuit, and wherein the feedback circuit generates a ramp signal that is fed to an input of the comparator circuit which is a function of the load current.

18. The circuit of claim 17, wherein the ramp signal has a slope which is a function of the load current.

19. The circuit of claim 18, wherein the slope of the ramp signal decreases as the load current decreases, and wherein a decrease in the slope of the ramp signal decreases the trip frequency of the comparator circuit, thereby decreasing the natural frequency of the dc—dc converter at low load currents.

20. A circuit for improving a power efficiency across a range of load currents in a dc—dc converter, comprising:
a buck converter circuit having an input and an output, wherein the output of the buck converter circuit comprises an output of the dc—dc converter;
a comparator circuit having a first input, a second input and an output, wherein the output is coupled to the input of the buck converter circuit, and the output of the buck converter is coupled to the first input of the comparator circuit; and
a feedback circuit having an input coupled to the output of the comparator circuit and an output coupled to the second input of the comparator circuit, which is also coupled to an input reference voltage,
wherein the feedback circuit is operable to provide a feedback signal which is superimposed over the input reference voltage, and wherein the feedback signal is a function of a load current of the dc—dc converter, and further wherein the feedback signal is operable to alter a trip frequency of the comparator circuit, thereby impacting a natural frequency of the dc—dc converter as a function of the load current.

21. The circuit of claim 20, wherein the feedback circuit via the feedback signal is operable to decrease the trip frequency of the comparator circuit as the load current decreases, thereby reducing a switching loss associated with the dc—dc converter at low load currents and improving power efficiency.

22. The circuit of claim 20, wherein the feedback signal comprises a ramp signal having a slope which is a function of the load current, and wherein the slope of the ramp signal dictates the trip frequency of the comparator circuit, thereby altering the natural frequency of the dc—dc converter.

23. The circuit of claim 22, wherein the slope of the ramp signal decreases as the load current decreases.

24. The circuit of claim 22, wherein the feedback circuit comprises:
a positive ramp circuit operable to dictate a positive slope of the ramp signal;
a negative ramp circuit operable to dictate a negative slope of the ramp signal; and
a ramp capacitor which charges at a rate dictated by the positive ramp circuit and discharges at a rate dictated by the negative ramp circuit, and wherein the ramp signal is related to a voltage across the ramp circuit.

25. The circuit of claim 24, wherein the positive ramp circuit comprises a positive ramp current source and a switch, wherein the switch is operable to couple the positive ramp current source to the ramp capacitor for charging thereof based on a state of the output of the comparator circuit, and wherein the positive ramp current source charges the ramp capacitor with a current which is a function of the load current.

26. The circuit of claim 25, wherein the charging current of the positive ramp current source decreases as the load current decreases, thereby decreasing a rate at which the ramp capacitor charges, which decreases the slope of the ramp signal and decreases the trip frequency of the comparator circuit.

27. The circuit of claim 25, wherein the positive ramp current source comprises:
a transconductance amplifier having a differential input; and
a sense resistor coupled across the differential input having a current conducting therethrough which is associated with the load current, thereby causing a differential input voltage to develop across the differential input which is associated with the load current,
wherein the transconductance amplifier is operable to generate a current which is a function of the differential input voltage and thus a function of the load current.

28. The circuit of claim 24, wherein the negative ramp circuit comprises a negative ramp current source and a switch, wherein the switch is operable to couple the negative ramp current source to the ramp capacitor for discharging thereof based on a state of the output of the comparator circuit, and wherein the negative ramp current source discharges the ramp capacitor with a current which is a function of the load current.

29. The circuit of claim 28, wherein the discharging current of the negative ramp current source decreases as the load current decreases, thereby decreasing a rate at which the ramp capacitor discharges, which decreases the slope of the ramp signal and decreases the trip frequency of the comparator circuit.

30. The circuit of claim 28, wherein the negative ramp current source comprises:
a transconductance amplifier having a differential input; and
a sense resistor coupled across the differential input having a current conducting therethrough which is associated with the load current, thereby causing a differential input voltage to develop across the differential input which is associated with the load current,
wherein the transconductance amplifier is operable to generate a current which is a function of the differential input voltage and thus a function of the load current.

* * * * *